United States Patent [19]
Tan et al.

[11] Patent Number: 5,866,643
[45] Date of Patent: Feb. 2, 1999

[54] HIGH PRINT QUALITY THERMAL TRANSFER RIBBONS

[75] Inventors: Yaoping Tan, Miamisburg; Marion E. McCreight, West Carrollton; Shashi G. Talvalkar, Kettering, all of Ohio

[73] Assignee: NCR Corporation, Dayton, Ohio

[21] Appl. No.: 717,963

[22] Filed: Sep. 23, 1996

[51] Int. Cl.$^6$ .................................................. C08K 5/15
[52] U.S. Cl. ...................... 524/109; 523/161; 524/110; 524/111; 524/277; 524/487
[58] Field of Search ............ 523/161; 524/277, 524/487, 109, 110, 111

[56] References Cited

U.S. PATENT DOCUMENTS

| | | | |
|---|---|---|---|
| 3,663,278 | 5/1972 | Blose et al. | 117/234 |
| 4,315,643 | 2/1982 | Tokunaga et al. | 282/27.5 |
| 4,403,224 | 9/1983 | Wirnowski | 346/1.1 |
| 4,463,034 | 7/1984 | Tokunaga et al. | 427/256 |
| 4,523,207 | 6/1985 | Lewis | 346/214 |
| 4,628,000 | 12/1986 | Talvalkar et al. | 428/341 |
| 4,687,701 | 8/1987 | Knirsch et al. | 428/216 |
| 4,698,268 | 10/1987 | Ueyama | 428/484 |
| 4,707,395 | 11/1987 | Ueyama et al. | 428/212 |
| 4,777,079 | 10/1988 | Nagamoto et al. | 428/212 |
| 4,778,729 | 10/1988 | Mizobuci | 428/484 |
| 4,869,941 | 9/1989 | Ohki | 428/40 |
| 4,923,749 | 5/1990 | Talvalkar | 428/341 |
| 4,975,332 | 12/1990 | Shini et al. | 428/500 |
| 4,983,446 | 1/1991 | Taniguchi et al. | 428/216 |
| 4,988,563 | 1/1991 | Wehr | 428/341 |
| 5,128,308 | 7/1992 | Talvalkar | 503/201 |
| 5,240,781 | 8/1993 | Obata et al. | 428/488.4 |
| 5,248,652 | 9/1993 | Talvalkar | 503/201 |

*Primary Examiner*—Edward J. Cain
*Attorney, Agent, or Firm*—Richard J. Traverso

[57] ABSTRACT

There is provided by the present invention methods for preparing coating formulations and thermal transfer ribbons which provide images of high resolution by thermal transfer printing. The formulations contain an incompatible resin or wax component for reduced cohesiveness between the components of the thermal transfer layer. These methods employ thermoplastic resins and waxes with distinct solubility in the absence of solvent to reduce cohesion but are sufficiently compatible as to exhibit film forming properties. A method for modifying a coating formulation is also provided where an incompatible resin or wax components is added thereto.

28 Claims, No Drawings

HIGH PRINT QUALITY THERMAL TRANSFER RIBBONS

FIELD OF THE INVENTION

The present invention relates to thermal transfer printing wherein images are formed on a receiving substrate by heating extremely precise areas of a print ribbon with thin film resistors. This heating of the localized area causes transfer of ink or other sensible material from the ribbon to the receiving substrate. The sensible material is typically a pigment or dye which can be detected optically or magnetically.

BACKGROUND OF THE INVENTION

Thermal transfer printing has displaced impact printing in many applications due to advantages such as the relatively low noise levels which are attained during the printing operation. Thermal transfer printing is widely used in special applications such as in the printing of machine readable bar codes and magnetic alpha-numeric characters. The thermal transer process provides great flexibility in generating images and allows for broad variations in style, size and color of the printed image. Representative documentation in the area of thermal transfer printing includes the following patents.

U.S. Pat. No. 3,663,278, issued to J. H. Blose et al. on May 16, 1972, discloses a thermal transfer medium having a coating composition of cellulosic polymer, thermoplastic resin, plasticizer and a "sensible" material such as a dye or pigment.

U.S. Pat. No. 4,315,643, issued to Y. Tokunaga et al. on Feb. 16, 1982, discloses a thermal transfer element comprising a foundation, a color developing layer and a hot melt ink layer. The ink layer includes heat conductive material and a solid wax as a binder material.

U.S. Pat. No. 4,403,224, issued to R. C. Winowski on Sep. 6, 1983, discloses a surface recording layer comprising a resin binder, a pigment dispersed in the binder, and a smudge inhibitor incorporated into and dispersed throughout the surface recording layer, or applied to the surface recording layer as a separate coating.

U.S. Pat. No. 4,463,034, issued to Y. Tokunaga et al. on Jul. 31, 1984, discloses a heat-sensitive magnetic transfer element having a hot melt or a solvent coating.

U.S. Pat. No. 4,523,207, issued to M. W Lewis et al. on Jun. 11, 1985, discloses a multiple copy thermal record sheet which uses crystal violet lactone and a phenolic resin.

U.S. Pat. No. 4,628,000, issued to S. G. Talvalkar et al. on Dec. 9, 1986, discloses a thermal transfer formulation that includes an adhesive-plasticizer or sucrose benzoate transfer agent and a coloring material or pigment.

U.S. Pat. No. 4,687,701, issued to K. Knirsch et al. on Aug. 18, 1987, discloses a heat sensitive inked element using a blend of thermoplastic resins and waxes.

U.S. Pat. No. 4,698,268, issued to S. Ueyama on Oct. 6, 1987, discloses a heat resistant substrate and a heat-sensitive transferring ink layer. An overcoat layer may be formed on the ink layer.

U.S. Pat. No. 4,707,395, issued to S. Ueyama et al., on Nov. 17, 1987, discloses a substrate, a heat-sensitive releasing layer, a coloring agent layer, and a heat-sensitive cohesive layer.

U.S. Pat. No. 4,777,079, issued to M. Nagamoto et al., on Oct. 11, 1988, discloses an image transfer type thermosensitive recording medium using thermosoftening resins and a coloring agent.

U.S. Pat. No. 4,778,729, issued to A. Mizobuchi on Oct. 18, 1988, discloses a heat transfer sheet comprising a hot melt ink layer on one surface of a film and a filling layer laminated on the ink layer.

U.S. Pat. No. 4,869,941, issued to Ohki on Sep. 26, 1989, discloses an imaged substrate with a protective layer laminated on the imaged surface.

U.S. Pat. No. 4,923,749, issued to Talvalkar on May 8, 1990, discloses a thermal transfer ribbon which comprises two layers, a thermal sensitive layer and a protective layer, both of which are water based.

U.S. Pat. No. 4,975,332, issued to Shini et al. on Dec. 4, 1990, discloses a recording medium for transfer printing comprising a base film, an adhesiveness improving layer, an electrically resistant layer and a heat sensitive transfer ink layer.

U.S. Pat. No. 4,983,446, issued to Taniguchi et al. on Jan. 8, 1991, describes a thermal image transfer recording medium which comprises as a main component, a saturated linear polyester resin.

U.S. Pat. No. 4,988,563, issued to Wehr on Jan. 29,1991, discloses a thermal transfer ribbon having a thermal sensitive coating and a protective coating. The protective coating is a wax-copolymer mixture which reduces ribbon offset.

U.S. Pat. Nos. 5,128,308 and 5,248,652, issued to Talvalkar, each disclose a thermal transfer ribbon having a reactive dye which generates color when exposed to heat from a thermal transfer printer.

And, U.S. Pat. No. 5,240,781, issued to Obatta et al., discloses an ink ribbon for thermal transfer printers having a thermal transfer layer comprising a wax-like substance as a main component and a thermoplastic adhesive layer having a film forming property.

Many attempts have been made to improve the print quality (resolution) of thermal transfer printing ribbons, some of which are described in the patents above. This has been accomplished by careful selection of different waxes, resin binders and other additives, which are compatible with the each other and optimizing the ratios of these components to obtain uniformity, good flowing characteristics, stability and a narrow melting range.

In conventional coating formulations, fine pigment powders and the optimization of component ratios have been used to obtain good fracture between transferred material and the non-transferred layer and thereby provide good quality images. However, this technique is limited with respect to the components used and the particle size of the pigments. Pigment particles can not be easily ground finer than micron size and are difficult to disperse when this small. A coating formulation comprising Kraton 1107 styrene-isoprene-styrene block elastomer by Shell Corp., Carnauba wax, sucrose benzoate and carbon black pigment has been found to provide thermal transfer ribbons with superior print resolution with carbon black pigments of a particular particle size. The use of incompatible components may enhance the desirable print characteristics, but it has not been known to select and/or identify incompatible components which produce desirable print characteristics. It is desirable to provide additional formulations with equivalent or improved performance in print resolution consistent with the continuing effort to enhance image quality and expand the use of thermal transfer ribbons.

SUMMARY OF THE INVENTION

It is an object of the present invention to provide a method for improving the print resolution of the images produced by thermal transfer printing.

It is another object of the present invention to provide a method for improving the print resolution of coating formulations and thermal transfer media which form images from thermal transfer printing by the manipulation of variables other than pigment particle size and wax/thermoplastic resin component ratios.

It is an additional object of the present invention to provide methods for preparing coating compositions and thermal transfer media which form images with high print resolution from thermal transfer printing.

It is a further object of the present invention to provide methods for preparing coating formulations and thermal transfer media which form images with high print resolution from thermal transfer printing by using unique combinations of conventional components.

These and other objects and advantages of this invention will become apparent and further understood from the detailed description and claims which follow.

DETAILED DESCRIPTION OF THE PREFERRED EMBODIMENTS

The above objects are achieved with the method for i) improving coating formulations, ii) preparing coating formulations and iii) preparing thermal transfer ribbons provided by the present invention. It has been discovered through this invention that the introduction of an incompatible component to a coating formulation provides reduced cohesion between the components thereof resulting in improved print resolution. Such a component will not interfere with the film-forming properties of the coating formulation where it can be solubilized, dispersed or emulsified in the solvent of the coating formulation.

Consistent with this discovery, there is provided by this invention a method for modifying a coating formulation to improve the print resolution of images obtained from thermal transfer printing, said coating formulations comprising a binder, a sensible material and one or more solvents.

This method comprises:

a) adding at least one incompatible thermoplastic resin, incompatible wax or combination thereof to a coating formulation in an amount of 2–20 wt. %, based on the total weight of solids of said coating formulation, said incompatible thermoplastic resin, incompatible wax or combination thereof being sufficiently incompatible with a component of the coating formulation so as to form a non-homogeneous molten mixture therewith in the absence of solvent, said incompatible thermoplastic resin, incompatible wax or combination thereof also being soluble, dispersible or emulsifiable within the one or more solvents of said coating formulation; and b) agitating the combination of coating formulation and incompatible thermoplastic resin, incompatible wax or combination thereof under conditions which form a common dispersion or emulsion.

The method for preparing coating formulations provided by this invention comprises:

a) forming a base formulation comprising:

i) one or more solid primary thermoplastic resins in particulate form other than Kraton 1107 styrene-isoprene-styrene block elastomer with a melting/softening point temperature in the range of 50° C. to 300° C., ii) one or more primary waxes with a melting/softening point temperature in the range of 40°–200° C. used in an amount of 40–80 wt. % based on total solids, and iii) one or more solvents capable of solubilizing, dispersing and/or emulsifying the one or more solid primary thermoplastic resins and one or more primary waxes, wherein the one or more primary thermoplastic resins and one or more primary waxes are sufficiently compatible so as to form a homogeneous molten mixture in the absence of solvent, b) adding 2–20 wt. %, based on the total solids of said coating formulation, of an incompatible component to said base formulation, said incompatible component being selected from the group consisting of waxes, thermoplastic resins and combinations thereof and being sufficiently incompatible with the one or more primary thermoplastic resins, one or more primary waxes or both the one or more primary waxes and one or more primary thermoplastic resins, so as to form a non-homogeneous molten mixture therewith in the absence of solvent, said incompatible component being soluble, dispersible or emulsifiable within the one or more solvents of the base formulation;

c) forming a common dispersion or emulsion of the one or more solid primary thermoplastic resins, one or more primary waxes and said incompatible component; and d) adding a sensible material to the common dispersion or emulsion of step c).

The methods for preparing thermal transfer ribbons of this invention comprise the additional steps of applying the common dispersion or emulsion to a flexible substrate to form a film and removing the one or more solvents from said film to form a solid coating.

DETAILED DESCRIPTION OF THE PREFERRED EMBODIMENTS

The methods of the present invention comprise as an essential step, the selection and/or identification and addition of an incompatible component to either a complete coating formulation or a base formulation of one or more primary waxes, one or more primary solid thermoplastic resins and one or more solvents. Such incompatibility provides reduced cohesion between the coating formulation components in the absence of solvent, such as thermal transfer layers produced from such coating formulations. With reduced cohesion between the coating formulation components, improved fracture and separation between transferred portions of the thermal transfer layer and those which remain on the substrate are achieved.

The term "incompatible component" as used herein defines components such as waxes and/or thermoplastic resins with solubility characteristics distinct from the formulations to which they are added such that they do not form a homogeneous liquid (molten) mixture in the absence of solvent.

In the methods for improving coating formulations, a component is added to the coating formulation which is incompatible with one or more components of the binder. In the methods for preparing coating formulations provided by this invention, a component is added to the base formulation which is incompatible with the one or more primary thermoplastic resins, one or more primary waxes or both a primary thermoplastic resin and a primary wax.

Typically, the added incompatible component and the formulation component are not soluble in the same solvents. For example, in the case of the method for preparing thermoplastic compositions provided by this invention, the primary wax or primary thermoplastic resin may be soluble in polar solvents. Suitable incompatible components will typically be soluble in non-polar solvents. Similarly, in the methods of this invention which provide improvements in resolution for coating formulations, the incompatible component (thermoplastic resin or wax) typically is soluble in solvents different from those of the binder components. The cause of the incompatible condition is not relevant and can be due to differences in properties such as polarity, molecular weight, pendent functional groups, terminal functional groups, etc. It should be emphasized that the methods of this invention encompass the use of thermoplastic resin and wax component combinations which do not exhibit distinct solubility requirements but are still incompatible so as to reduce cohesion of the coating formulation in the absence of solvent.

While it is necessary for the incompatible component to provide thermal transfer layers which reduce cohesion between components, it is also necessary that the coating formulation exhibit film-forming properties to provide for the formation of thermal transfer layers for thermal transfer media. The incompatible component cannot be so dissimilar from the other wax and thermoplastic resin components so as to prevent the formation of films. To provide for the film-forming properties, the incompatible components employed are limited to those which form a common dispersion or emulsion with the base formulation or coating formulation in the one or more solvents employed in these formulations. Therefore, the incompatible components used in the method of this invention must be soluble, dispersible or emulsifiable in that the one or more solvents of the base formulation or coating formulation.

The coating formulations which can be treated by the methods of the present invention to improve resolution include conventional formulations which comprise a binder, solvent and sensible material (pigments and magnetic particles). The binder preferably comprises a wax component and thermoplastic resin component and can include any of the conventionally known waxes and thermoplastic resins known in the art to be suitable for use in thermal transfer printing, examples of which are given below. The solvents used can also vary widely, from water to mineral spirits. Suitable examples of solvents and sensible materials are also given below.

The base formulation employed in the method for preparing coating formulations of the present invention comprises a primary thermoplastic resin and a primary wax. The thermoplastic resins and waxes used in conventional coating formulations and thermal transfer media can be used as the primary thermoplastic resins and primary waxes in the methods of the present invention. Examples of the primary thermoplastic resins which can be used are those having a melting/softening point in the range of 50° C. to 300° C., preferably in the range of 100° C. to 250° C. Specific examples of suitable conventional thermoplastic resins include polyvinyl chloride, polyvinyl acetate, vinyl chloride-vinyl acetate copolymers, polyethylene, polypropylene, polyacetal, ethylene-vinyl acetate copolymers, ethylene alkyl (meth)acrylate copolymers, ethylene-ethyl acetate copolymer, polystyrene, styrene copolymers, polyamide, ethylcellulose, epoxy resin, xylene resin, ketone resin, petroleum resin, rosin or its derivatives, terpene resin, polyurethane resin, polyvinyl butyryl, synthetic rubber such as styrene-butadiene rubber, nitrile rubber, acrylic rubber and ethylene-propylene rubber. Also suitable are polyvinyl alcohol, ethylene alkyl (meth)acrylate copolymers, styrene-alkyl (meth) acrylate copolymer, saturated polyesters and the like. Suitable saturated polyesters are described in U.S. Pat. No. 4,983,446.

It should be recognized that mixtures of the above-identified resins can be used. The composition of the coating formulation and the thermal transfer layer can be controlled so as to adjust the temperature at which the coating is transferred to the receiving substrate. In the viewpoint of transfer sensitivity, it is desirable for the thermoplastic resins to have a low softening temperature. From the viewpoint of image integrity, it is desirable for these resins to have a high softening temperature.

The thermoplastic resin component in the base formulation and coating formulation preferably falls within the range of about 5 to 40 weight percent, particularly 10 to 20 weight percent based on the weight of total dry ingredients.

The waxes which can be used to provide the base formulation in the methods of this invention and coating formulations of this invention include waxes conventionally used in thermal transfer media which are compatible with the thermoplastic resin of the base formulation or coating formulation. Suitable wax substances include natural waxes such as whale wax, bees wax, lanolin, carnauba wax, rice wax, candelilla wax, montan wax and ceresine wax; petroleum waxes such as paraffin wax and microcrystalline waxes, synthetic waxes such as oxidized wax, ester wax, low molecular weight polyethylene and Fisher-Tropsch wax; higher fatty acids such as lauric acid, myristic acid, palmitic acid, stearic acid and behenic acid; higher aliphatic alcohol such as stearyl alcohol; esters such as sucrose fatty acid esters, sorbitan fatty acid esters and amides. The primary wax substances may be used singly or in admixture. When using two or more waxes in the base formulation, they are compatible when molten. They are preferably used in an amount of 40 to 80 wt. %, based on the total weight of solids in the common dispersion. The melting points of preferred waxes used in conventional thermal transfer layers range from 40° C. to 200° C., more preferably 75° C. to 150° C. As with thermoplastic resins, higher melting points tend to enhance the integrity of the image obtained, but transfer sensitivity tends to be decreased.

Another component of the based formulations and coating formulations employed in the methods of this invention is one or more solvents. These solvents solubilize, disperse or emulsify the components of the base formulation or coating formulation. Solvents used in conventional coating formulations are typically suitable for use preparing the base formulation. To provide a dispersion or emulsion which is water-rich, the solvent comprises primarily water and alkanols such as propanol. However, organic solvent mixtures, such as mineral spirits with a boiling point in the range of 150° C. to 190° C. are also suitable. The amount of solvent used preferably provides a total solids content consistent with conventional coating formulations, which typically contain amounts in the range of about 10 to 55 weight percent, based on total weight of the coating formulation. Preferably, the coating formulation contains about 30 weight percent solids.

In the methods for improving the resolution of coating formulations provided by this invention, a sensible material is already incorporated within the coating formulation which is used. In the methods for preparing coating formulations provided by this invention, a sensible material is not part of the base formulation to which the incompatible component is added. Instead, the sensible material is added to the base formulations subsequent to the addition of the incompatible component.

Suitable sensible materials for use in the methods of this invention are capable of being sensed visually, by optical means, by magnetic means, by electroconductive means or by photoelectric means. The sensible material is typically a coloring agent such as a dye or pigment or magnetic particles. Any conventional coloring agent used in conventional ink ribbons is suitable for the methods herein, including carbon black and a variety of organic and inorganic coloring pigments and dyes, examples of which include phthalocyanine dyes, fluorescent naphthalimide dyes and others such as cadmium, primrose, chrome yellow, ultra marine blue, titanium dioxide, zinc oxide, iron oxide, cobalt oxide, nickel oxide, etc. Any conventional magnetic pigment or particles used in imaging or in coating operations to enable optical, human or machine reading of the characters is also suitable. The sensible material is typically used in an amount from about 5 to 80 parts by weight of the total dry ingredients for the coating formulation which provides the thermal transfer layer.

The methods of this invention allow for the use of selective additives such as conventional plasticizers, flexibilizers, surfactants, emulsifiers or fillers within the coating formulations and base formulations to aid in processing of the thermal transfer layer. Suitable plasticizers used are adipic acid esters, phthalic acid esters, ricinoleic acid esters, sebasic acid esters, succinic acid esters, chlorinated diphenyls, citrates, epoxides, glycerols, glycols, hydrocarbons, chlorinated hydrocarbons, phosphates, and the like. The plasticizer provides low temperature sensitivity and flexibility to the thermal transfer layer so as not to flake off the substrate.

One skilled in the art can draw from the conventional resins and waxes described above to obtain incompatible components with little or no testing. For example, a thermoplastic resin known to be insoluble in water is expected to be incompatible with a water emulsifiable wax and/or thermoplastic resin. This can be confirmed by forming a molten mixture to determine homogeneity. A solvent is then selected which will form a common dispersion or emulsion based on known solubility properties. This can be confirmed by routine testing. Where the solubility of the thermoplastic resin components and wax components are not known, testing is routine.

Examples of components which are incompatible with Carnauba wax and base formulations which contain Carnauba wax include polyethylene, ethylene ethyl acetate copolymers, polyamides, epoxy resins, ketone resins, rosin, terpene resins, acrylic resin, silicone resins, polyester resins, styrene-alkyl (meth)acrylate copolymers and ethylene alkyl (meth)acrylate copolymers.

To prepare the base formulation, solutions, dispersions, or emulsions of the components are typically combined in a vessel or conventional grinding equipment (ball mill) and agitated. Typically, the solids are added as dispersions at about 30 wt. % solids.

Following the preparation of a base formulation, the appropriate incompatible solid thermoplastic resin/wax components are added to the base formulation and agitated to form a common dispersion or emulsion. The dispersion or emulsion can be prepared using conventional grinding equipment and process conditions used in preparing such formulations. This includes an attritor and/or a ball mill which form fine particulate dispersions and emulsions. Such conventional grinding equipment can also be used when adding an incompatible component to a preformed coating formulation and forming a common dispersion or emulsion in the methods for improving/modifying such formulations provided by this invention.

The resulting mixture is typically a common emulsion or dispersion of particulates in that at least one wax or thermoplastic resin component is insoluble in the solvent employed. Forming particulate dispersions and emulsions with Angstrom sized particulates is preferred.

The coating formulations prepared by the methods of the present invention will provide thermal transfer layers for thermal transfer media and are used in the preparation of thermal transfer ribbons provided by this invention. These methods comprise the additional steps of applying a coating formulation prepared by a method of the present invention to a flexible substrate to form a film and the solvents therein are removed to provide a solid coating, preferably at a coat weight of 1.9 to 5.0 g/m$^2$. Coat weights higher than those of conventional ribbons can be employed because of the reduced cohesion between components.

Conventional process equipment and conditions can be used in applying the coating formulation to a substrate. This typically includes coating a substrate with the coating formulation with either a Meyer Rod or similar wire-bound doctor bar set up on a typical solvent coating machine to provide a desired coating thickness, typically in the range of 0.0001 to 0.0004 inches. This coating thickness equates to a coating weight of between 4 and 16 milligrams per four square inches. The flexible substrate is preferably a thin smooth paper or plastic-like material. Tissue type paper materials such as 30–40 gauge capacitor tissue, manufactured by Glatz and polyester-type plastic materials such as 14–35 gauge polyester film manufactured by Dupont under the trademark Mylar® are suitable. Polyethylene naphthalate films, polyamide films such as nylon, polyolefin films such as polypropylene film, cellulose films such as triacetate film and polycarbonate films are also suitable. The flexible substrates should have high tensile strength to provide ease in handling and coating and preferably provide these properties at minimum thickness and low heat resistance to prolong the life of heating elements within thermal print heads. The thickness is preferably 3 to 50 microns. If desired, the flexible substrate or base film may be provided with a backcoating on the surface opposite the thermal transfer layer. For some substrates, a backcoating is required.

The thermal transfer layer has a softening point below 250° C., preferably below 200° C. and most preferably from 50° C. to 150° C. Softening temperatures within this range enable the thermal transfer medium to be used in conventional thermal transfer printers, which typically have print heads which operate at temperatures in the range of 100° C. to 250° C., more typically, temperatures in the range of 150° C to 200° C.

Suitable thermal transfer layers are derived from coating formulations having approximately 10 to 55 percent dry ingredients. A temperature of approximately 100° F. to 150° F. is maintained during the entire coating process. After the coating is applied to the substrate, the substrate is passed through a dryer at an elevated but moderate temperature which is below the boiling point of the volatile components to ensure drying and adherence of the coating onto the substrate in making the transfer ribbon. The above-mentioned coating weight as applied by the Meyer Rod onto a preferred 3 to 12 $\mu$m thick substrate translates to a total thickness of 6 to 15 $\mu$m. The thermal transfer layer typically can be fully transferred onto a receiving substrate at a temperature in the range of about 75° C. to 200° C.

A thermal transfer medium of this invention in the form of a thermal transfer print ribbon provides all the advantages of thermal printing. When the thermal transfer layer is exposed to the heating elements (thin film resistor) of a thermal print head, a thermal transfer layer is transferred from the ribbon to the receiving substrate in a manner to produce precisely defined characters on the substrate for optical or magnetic recognition by either machine or human.

The entire disclosure of all applications, patents and publications, cited above and below, are hereby incorporated by reference.

Without further elaboration, it is believed that one skilled in the art can, using the preceding description, utilize the present invention to its fullest extent.

EXAMPLES

EXAMPLE 1

Consistent with a method of the present invention, the following combination of compounds were selected after confirming a) the primary wax and primary thermoplastic resin are compatible and b) the added component is incompatible with the primary wax in the absence of solvent:

Primary Thermoplastic Resin—Ethylvinyl Acetate Copolymer (EVA)

Primary Wax—Carnauba Wax

Added Component—ASG-Sucrose Benzoate—alcohol soluble grade (not soluble in mineral spirits alone).

The ASG-sucrose benzoate (2–20% total solids) is dissolved in isopropyl alcohol (10 wt. % total liquid). The weight % total solids and liquids is based on the total within the final formulation. The EVA copolymer (2–10 wt. % total solids) and carnauba wax (40–80 wt. % total solids) are dissolved in mineral spirits (90 wt. % total liquid). The wax and resin solutions are combined in an attritor with agitation. The carnauba wax solution is added first followed by the EVA solution. The sucrose benzoate solution is added therewith, preferably with heating. Carbon black (10–20 total wt. %) is then added to this combination and ground for 2 hours to form a common dispersion. The common dispersion is coated on a Mylar polyester film to form a thermal transfer medium.

EXAMPLE 2

Consistent with the method of the present invention for preparing coating formulations, the following combination of compounds were selected after confirming a) the primary wax and primary thermoplastic resin are compatible and b) the added component was incompatible with the primary wax in the absence of solvent:

Primary Thermoplastic Resin—Kraton 1107

Styrene-lsoprene-Styrene block copolymer

Primary Wax—Carnauba Wax

Added Component—ASG-Sucrose Benzoate—alcohol soluble grade (not soluble in mineral spirits alone).

The ASG-sucrose benzoate (2–20% total solids) is dissolved in isopropyl alcohol (10 wt. % total liquid). The weight % total solids and liquids is based on the total within the final formulation. The Kraton 1107 styrene-isoprene-styrene block copolymer (2–10 wt. % total solids) and Carnauba Wax (40–80 wt. % total solids) are dissolved in mineral spirits (90 wt. % total liquid). The wax and resin solutions are combined in an attritor with agitation. The Carnauba Wax solution is added first followed by the Kraton 1107 solution. The sucrose benzoate solution is added to the attritor thereafter. Carbon black (10–20 total wt. %) is then added to this combination and ground for 2 hours to form a common dispersion. The common dispersion is coated on a Mylar polyester film to form a thermal transfer medium.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method of modifying a coating formulation for thermal transfer ribbons to improve the print resolution of printed images obtained from thermal transfer printing, wherein said coating formulation comprises a binder having a thermoplastic resin and wax soluble in non-polar solvents, a sensible material and one or more solvents, said method comprising:

a) identifying a thermoplastic resin, wax, sucrose benzoate or combination thereof which is incompatible with the thermoplastic resin and wax of the coating formulation, said step comprising forming a molten mixture with the wax and thermoplastic resin of the coating formulation and a thermoplastic resin, wax, sucrose benzoate or combination thereof which is soluble in polar solvents, and identifying thermoplastic resins, waxes, sucrose benzoate and combinations thereof as incompatible components which form non-homogeneous mixtures in the absence of solvent;

b) adding at least one thermoplastic resin, wax, sucrose benzoate or combination thereof to said coating formulation in an amount of 2–20 wt. %, based on the total weight of solids of said coating formulation, said thermoplastic resin, wax, sucrose benzoate or combination thereof being i) sufficiently incompatible with a component of the coating formulation so as to form a non-homogeneous molten mixture therewith in the absence of solvent, and ii) soluble, dispersible or emulsifiable within one or more solvents of said coating formulation; and c) agitating the combination of coating formulation and thermoplastic resin, wax, sucrose benzoate or combination thereof under conditions which form a common dispersion or emulsion.

2. A method for modifying a coating formulation as in claim 1, wherein the incompatible component is added with a polar solvent and the combination of coating formulations and incompatible component is heated to form a common dispersion.

3. A method as in claim 2, wherein the one or more non-polar solvents of the coating formulation is selected from the group consisting of mineral spirits and the incompatible component is dissolved in one or more polar solvents selected from the group consisting of water and alkanols.

4. A method as in claim 1, wherein the one or more incompatible thermoplastic resins which are selected from the group consisting of polyethylene, ethylene-ethylacetate copolymers, epoxy resins, ketone resins, rosin, terpene resins, acrylic resins, polyurethane resins, styrene-alkyl (meth)acrylate copolymers, polyester resins, silicone resins and ethylene-alkyl(meth)acrylate copolymers.

5. A method as in claim 1, wherein the binder comprises Carnauba wax and the incompatible component is sucrose benzoate.

6. A method for modifying coating formulations as in claim 2, wherein the solvent added with the incompatible component is evaporated from the common dispersion or emulsion with heating.

7. A method for modifying coating formulations as in claim 6, wherein the common dispersion or emulsion comprises mineral spirits as the solvent.

8. A method of modifying a coating formulation for thermal transfer ribbons to improve the print resolution of printed images obtained from thermal transfer printing, wherein said coating formulation comprises a thermoplastic resin and Carnauba wax which are soluble in non-polar solvents, a sensible material and one or more non-polar solvents, said method comprising:
   a) identifying at least one thermoplastic resin, wax, sucrose benzoate or combination thereof which is incompatible with Carnauba wax by forming a molten mixture of Carnauba wax and a thermoplastic resin, wax, sucrose benzoate or combination thereof which is soluble in polar solvents and identifying thermoplastic resins, waxes and combination thereof which form non-homogeneous mixtures in the absence of a solvent;
   b) adding at least one incompatible thermoplastic resin, incompatible wax, sucrose benzoate or combination thereof to said coating formulation in an amount of 2–20 wt. %, based on the total weight of solids of said coating formulation, said incompatible thermoplastic resin, incompatible wax, sucrose benzoate or combination thereof being soluble, dispersible or emulsifiable within one or more solvents of said coating formulation; and
   c) agitating the combination of coating formulation and incompatible thermoplastic resin, incompatible wax, sucrose benzoate or combination thereof under conditions which form a common dispersion or emulsion.

9. A method for preparing coating formulations which comprises:
   a) forming a base formulation comprising:
      i) 5–40 wt. %, based on the weight of total solids of the coating formulation, of one or more solid primary thermoplastic resins in particulate form other than Kraton 1107 styrene-isoprene-styrene black copolymers with a melting/softening point temperature in the range of 50° C. to 300° C.,
      ii) one or more primary waxes with a melting/softening point temperature in the range of 40°–200° C. used in an amount of 40% to 80% based on total solids, and
      iii) one or more solvents capable of solubilizing, dispersing and/or emulsifying the one of more solid primary thermoplastic resins and one or more primary waxes, wherein the one or more primary thermoplastic resins and one or more primary waxes are sufficiently compatible so as to form a homogeneous molten mixture in the absence of solvent,
   b) adding 2–20 wt. %, based on the total solids of said coating formulation, of an incompatible component to said base formulation, said incompatible component being selected from the group consisting of waxes, thermoplastic resins and combinations thereof which are
      i) sufficiently incompatible with the one or more primary thermoplastic resins, sucrose benzoate, one or more primary waxes or both the one or more primary waxes and one or more primary thermoplastic resins so as to form non-homogeneous molten mixtures therewith in the absence of solvent, and are
      ii) soluble, dispersible or emulsifiable within the one or more solvents of the base formulation;
   c) forming a common dispersion or emulsion of the one or more solid primary thermoplastic resins, one or more primary waxes and said incompatible component; and
   d) adding a sensible material to the common dispersion or emulsion of step c).

10. A method for preparing a coating formulation as in claim 9, wherein the primary wax is Carnauba wax, the primary thermoplastic resin is soluble in non-polar solvents and said method comprises the additional step of identifying a thermoplastic resin, wax, sucrose benzoate or combination thereof as an incompatible component, said additional step comprising forming a molten mixture with Carnauba wax and primary thermoplastic resin of the coating formulation and a thermoplastic resin wax or combination thereof which is soluble in polar solvents, and identifying the thermoplastic resins, waxes, sucrose benzoate and combinations thereof, as incompatible components which form non-homogeneous mixtures in the absence of solvent.

11. A method for preparing coating formulations as in claim 9, wherein the one or more primary thermoplastic resins are selected from the group consisting of polyvinyl chloride, polyvinyl acetate, vinyl chloride-vinyl acetate copolymers, polyethylene, polypropylene, polyacetal, ethylene-vinyl acetate copolymers, ethylene alkyl (meth) acrylate copolymers, ethylene-ethyl acetate copolymer, polystyrene, styrene copolymers, polyamide, ethylcellulose, epoxy resin, xylene resin, ketone resin, petroleum resin, rosin, terpene resin, polyurethane resin, polyvinyl butyryl, nitrile rubber, acrylic rubber, ethylene-propylene rubber, polyvinyl alcohol, ethylene alkyl (meth)acrylate copolymers, styrene-alkyl (meth) acrylate copolymers and saturated polyesters.

12. A method for preparing coating formulations of claim 9, wherein the one or more primary waxes are selected from the group consisting of whale wax, bees wax, lanolin, carnauba wax, rice wax, candelilla wax, montan wax, ceresine wax, paraffin wax, microcrystalline waxes, oxidized waxes, ester waxes, low molecular weight polyethylene, Fisher-Tropsch wax, higher fatty acids, higher aliphatic alcohols and amides.

13. A method as in claim 10, wherein the incompatible component is one or more incompatible thermoplastic resins selected from the group consisting of polyethylene, ethylene-ethylacetate copolymer, epoxy resin, ketone resin, rosin, terpene resin, polyurethane resins, acrylic resins, styrene-alkyl(meth)acrylate copolymers, silicone resins, polyester resins and ethylene-alkyl(meth)acrylate copolymers.

14. A method for preparing coating formulations as in claim 9, wherein the sensible material is carbon black in an amount of 5–50 parts by weight of the coating formulation.

15. A method for preparing coating formulations as in claim 9, wherein the incompatible component is added in solution and the coating formulations and incompatible component are heated to form a common dispersion.

16. A method as in claim 15, wherein the one or more solvents of the coating formulation are from the group consisting of mineral spirits and the incompatible component is dissolved in one or more solvents selected from the group consisting of water and alkanols.

17. A method for preparing coating formulations as in claim 15, wherein the solvent added with the incompatible compound is evaporated from the common dispersion or emulsion with heating.

18. A method as in claim 9, wherein the primary wax is Carnauba wax and incompatible component is sucrose benzoate.

19. A method for preparing coating formulations which comprises:
   a) forming a base formulation comprising:
      i) 5–40 wt. %, based on the weight of total solids of the coating formulation, of one or more solid primary thermoplastic resins soluble in polar solvents in particulate form with a melting/softening point temperature in the range of 50° C. to 300° C.,
      ii) Carnauba wax with a melting/softening point temperature in the range of 40°–200° C. used in an amount of 40% to 80% based on total solids, and
      iii) one or more non-polar solvents capable of solubilizing, dispersing and/or emulsifying the one or more solid primary thermoplastic resins and Carnauba wax, wherein the one or more primary thermoplastic resins and Carnauba wax are sufficiently compatible so as to form a homogeneous molten mixture in the absence of solvent,
   b) identifying a thermoplastic resin, wax, sucrose benzoate or combination thereof which is incompatible by forming a molten mixture with Carnauba wax and a thermoplastic resin wax, sucrose benzoate or combination thereof, which is soluble in polar solvents and identifying thermoplastic resins, waxes, sucrose benzoate and combinations thereof as incompatible components which form non-homogeneous mixtures;
   c) adding 2–20 wt. %, based on the total solids of said coating formulation, of an incompatible component to said base formulation, said incompatible component being selected from the group consisting of waxes, thermoplastic resins, sucrose benzoate and combinations thereof which are soluble, dispersible or emulsifiable within the one or more solvents of the base formulation;
   d) forming a common dispersion or emulsion of the one or more solid primary thermoplastic resins, one or more primary waxes and said incompatible component; and
   e) adding a sensible material to the common dispersion or emulsion of step d).

20. A method for preparing a thermal transfer ribbon with a thermal transfer layer which transfers images to a substrate by selectively heating portions thereof with a thermal print head of a thermal printer, said method comprising:
   a) forming a base formulation comprising:
      i) 5–40 wt. %, based on the weight of total solids of the coating formulation, of one or more solid primary thermoplastic resins in particulate form other than Kraton 1107 styrene-isoprene-styrene block copolymers with a melting/softening point temperature in the range of 50° C. to 300° C.,
      ii) one or more primary waxes with a melting/softening point temperature in the range of 40°–200° C. used in an amount of 40% to 80% based on total solids, and
      iii) one or more solvents capable of solubilizing, dispersing and/or emulsifying the one or more solid primary thermoplastic resins and one or more primary waxes, wherein the one or more primary thermoplastic resins and one or more primary waxes are sufficiently compatible so as to form a homogeneous molten mixture in the absence of solvent,
   b) adding 2–20 wt. %, based on the total solids of said coating formulation, of an incompatible component to said base formulation, said incompatible component being selected from the group consisting of waxes, thermoplastic resins and combinations thereof which are
      i) sufficiently incompatible with the one or more primary thermoplastic resins, one or more primary waxes or both the one or more primary waxes and one or more primary thermoplastic resins so as to form non-homogeneous molten mixtures therewith in the absence of solvent, and are
      ii) soluble, dispersible or emulsifiable within the one or more solvents of the base formulation;
   c) forming a common dispersion or emulsion of the one or more solid primary thermoplastic resins, one or more primary waxes and said incompatible component; and
   d) adding a sensible material to the common dispersion or emulsion of step c)
   e) applying said common dispersion or emulsion to a flexible substrate to form a film thereof, and
   f) removing the one or more solvents from said film to form a solid coating.

21. A method for preparing thermal transfer ribbons as in claim 20, wherein the incompatible component is one or more solid thermoplastic resins selected from the group consisting of polyethylene, ethylene ethyl acetate copolymer, epoxy resins, ketone resins, rosin, terpene resins, polyurethane resins, acrylic resins, ethylene alkyl methacrylate copolymers, silicone resins, styrene allyl methacrylate copolymers and polyester resins.

22. A method for preparing thermal transfer ribbons as in claim 20, wherein the one or more solvents of the base formulation are selected from the group of non-polar solvents consisting of mineral spirits and the incompatible compound is dissolved in one or more polar solvents selected from the group consisting of water and alkanols.

23. A method for preparing a thermal transfer ribbon as in claim 22, wherein the solution added with the incompatible component is evaporated from the common dispersion or emulsion with heating.

24. A method for preparing thermal transfer ribbons as in claim 20, wherein the one or more primary thermoplastic resins are selected from the group consisting of polyvinyl chloride, polyvinyl acetate, vinyl chloride-vinyl acetate copolymers, polyethylene, polypropylene, polyacetal, ethylene-vinyl acetate copolymers, ethylene alkyl (meth) acrylate copolymers, ethylene-ethyl acetate copolymer, polystyrene, styrene copolymers, polyamide, ethylcellulose, epoxy resin, xylene resin, ketone resin, petroleum resin, rosin, terpene resin, polyurethane resin, polyvinyl butyryl, nitrile rubber, acrylic rubber, ethylene-propylene rubber, polyvinyl alcohol, ethylene-alkyl (meth)acrylate copolymers, styrene-alkyl (meth) acrylate copolymers and saturated polyesters.

25. A method for preparing thermal transfer ribbons as in claim 22, wherein the one or more waxes are selected from the group consisting of whale wax, bees wax, lanolin, carnauba wax, rice wax, candelilla wax, montan wax, ceresine wax, paraffin wax, microcrystalline waxes, oxidized waxes, ester waxes, low molecular weight polyethylene Fisher-Tropsch wax, higher fatty acids, higher aliphatic alcohols and amides.

26. A method for preparing thermal transfer ribbons as in claim 20, wherein the sensible material is carbon black in an amount of 5–50 parts by weight of the common dispersion or emulsion.

27. A method for preparing thermal transfer ribbons as in claim 20, wherein the solid coating deposited on the flexible substrate has a coat weight in the range of 1.9 to 5.0 g/m$^2$.

28. A coating formulation which comprises:
a) a base formulation comprising Carnauba wax, a thermoplastic resin which forms a homogeneous mixture with Carnauba wax other than Kraton 1107 styreneisoprene-styrene block copolymers and sucrose benzoate which is incompatible or a thermoplastic resin which is incompatible with Carnauba wax, wherein the incompatible thermoplastic resin is selected from the group consisting of polyethylene, ethylene-ethylacetate copolymer, epoxy resin, ketone resin, rosin, terpene resin, polyurethane resins, acrylic resins, styrene-alkyl (meth)acrylate copolymers, silicone resins, polyester resins and ethylene-alkyl(meth)acrylate copolymers and combinations thereof.

* * * * *